J. J. REHANEK.
AUTOMOBILE SLEEPER.
APPLICATION FILED APR. 1, 1920.

1,378,615.

Patented May 17, 1921.

Inventor
James J. Rehanek,

By
Attorney

UNITED STATES PATENT OFFICE.

JAMES J. REHANEK, OF COLUMBIA, SOUTH CAROLINA.

AUTOMOBILE-SLEEPER.

1,378,615.  Specification of Letters Patent.  Patented May 17, 1921.

Application filed April 1, 1920. Serial No. 370,491.

*To all whom it may concern:*

Be it known that JAMES J. REHANEK, a citizen of the United States of America, residing at Columbia, in the county of Richland and State of South Carolina, has invented new and useful Improvements in Automobile-Sleepers, of which the following is a specification.

The object of the invention is to provide means whereby the seat stretcher of an automobile or like vehicle may be converted into a couch or berth to permit of occupation thereof in a reclining position or to serve as sleeping quarters while adapted under ordinary conditions to perform the usual functions without involving any obstruction to the interior of the car or occupying any space which ordinarily may be utilized when the car is employed as usual for touring or business purposes, and with these objects in view the invention consists in a construction and combination of parts of which a preferred embodiment is shown in the drawing, wherein:

Figure 2:
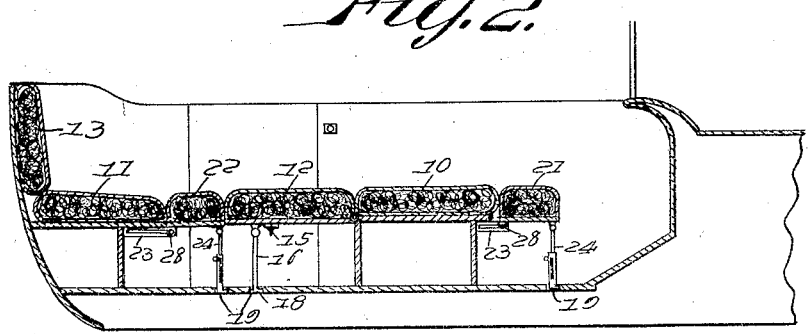
Fig. 2 is a similar view showing the parts arranged to form a bed or couch.
Figures 3, 4:
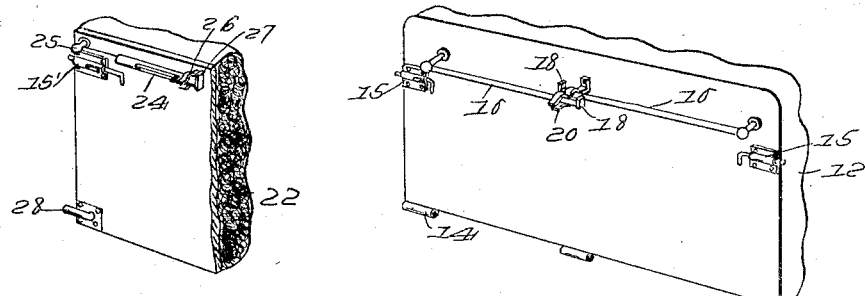
Fig. 3 is a perspective view of a portion of one of the auxiliary facing members or fillers.
Fig. 4 is a similar view of one of the back members.

The invention is shown applied to a car provided with front and rear seats or in other words of the five or seven-passenger type wherein the seat members 10 and 11 upholstered as in the ordinary practice are disposed in operative relation with back members 12 and 13 of which the latter may be fixed or stationary while the former is foldably mounted as by means of hinges 14 to permit of the arrangement thereof in a horizontal position as indicated in Fig. 2. The means for securing the forward back member 12 in its upright or normal position may consist as shown, of bolts 15 adapted for engagement with suitable sockets in the side walls of the car body, but for supporting said back member in its horizontal position it is preferable to employ legs or standards 16 pivotally mounted as at 17 upon the rear surface of the frame of the back member and provided with terminal T-heads 18 for engagement with slots 19 formed in the floor of the car body. These legs or standards when folded, as when the back member is in its upright position, are adapted for engagement by a spring clip or clamp 20 showing that the legs or standards are disposed in substantial parallelism with the back member in position to perform the function of a robe rail ordinarily employed particularly in cars of the touring type.

Figure 1:
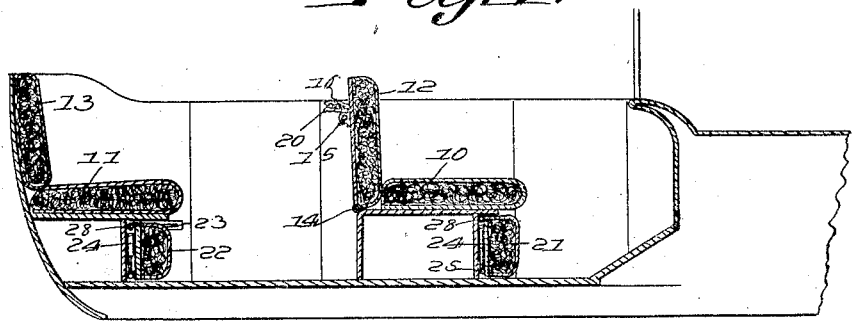
Figure 1 is a longitudinal section view of the car body having an equipment embodying the invention arranged to perform the functions of seats.

Also in connection with the seat and foldable back members there are employed supplemental filler members 21 and 22 disposed respectively adjacent to the forward edges of the front and rear seat members and mounted in guides 23 to permit of their sliding movement forward and rearward so that when not in use they may be housed under the seat members respectively, and when advanced may be swung upward into positions in the plane of the seat members as indicated in Fig. 2. To this end the guides 23 preferably consist of slotted bars in which operate slides on the ends of the filler members, and to support the latter in either horizontal or operative positions folding legs or standards 24 may be hingedly mounted as at 25 as described in connection with the legs or standards of the foldable back member 12, and adapted to be secured in folded position by means of clips or clamps 26 to hold them out of the way when the filler members are housed as indicated in Fig. 1. The legs or standards 24 are provided with terminal cross heads 27 for engagement with the above noted slots 19 in the floor of the car body.

Obviously when it is desired to convert the car into sleeping quarters the back member of the forward seat may be let down and secured in a horizontal position as indicated in Fig. 2 while the auxiliary filler members may be drawn forward and correspondingly secured in a plane common with the seat members and the adjusted back member, to the end that a couch of convenient length may be provided in a plane sufficiently below the upper edge of the walls of the car body to afford suitable protection for the occupant, without disturbing or disarranging any of the other features of the car or interfering with the operation of the doors by which access to the same is afforded.

What is claimed is:

An automobile body having forward and rear seats of which the former is provided with a hingedly mounted foldable back member and means for securing the same in its upright position, foldable legs mounted on the rear side of said back member adjacent opposite sides and the top edge to support the back member in the plane of the seat members, the free extremities of said legs overlapping when the latter are in forward position, a spring clamp mounted medially on the rear side of said back member and adapted to releasably secure the overlapping extremities of said legs to hold the same in horizontal parallelism with the plane of the back member to serve as a robe rail, and foldable filler members for arrangement in a common plane with said seat members.

In testimony whereof he affixes his signature.

JAMES J. REHANEK.